United States Patent [19]
Wille et al.

[11] Patent Number: 5,151,994
[45] Date of Patent: Sep. 29, 1992

[54] DISTRIBUTED FAIR ARBITRATION SYSTEM USING SEPARATE GRANT AND REQUEST LINES FOR PROVIDING ACCESS TO DATA COMMUNICATION BUS

[75] Inventors: Ross M. Wille, Sunnyvale; Richard J. Carter, Palo Alto, both of Calif.

[73] Assignee: Hewlett Packard Company, Palo Alto, Calif.

[21] Appl. No.: 780,578

[22] Filed: Oct. 22, 1991

Related U.S. Application Data

[63] Continuation of Ser. No. 436,144, Nov. 13, 1989, abandoned.

[51] Int. Cl.⁵ ............... G06F 9/46; G06F 13/368
[52] U.S. Cl. ............... 395/800; 395/425; 395/325; 395/725; 364/DIG. 2; 364/937.01
[58] Field of Search ............... 395/800, 425, 325; 364/200 MS File, 900 MS File

[56] References Cited

U.S. PATENT DOCUMENTS

| | | | |
|---|---|---|---|
| 3,949,368 | 4/1976 | West | 364/200 |
| 4,232,296 | 11/1980 | Burke et al. | 364/200 |
| 4,554,628 | 11/1985 | Bell | 364/200 |
| 4,633,394 | 12/1986 | Georgiou et al. | 364/200 |
| 4,663,756 | 5/1987 | Retterah | 370/85 |
| 4,766,536 | 8/1988 | Wilson, Jr. et al. | 364/200 |
| 4,920,486 | 4/1990 | Nielsen | 364/200 |
| 4,926,419 | 5/1990 | Whipple | 370/85.6 |
| 4,953,081 | 8/1990 | Feal et al. | 364/200 |

OTHER PUBLICATIONS

"True Round Robin Arbitrator", Research Disclosure Oct. 1985, No. 258, pp. 501-503.

*Distributed Round-Robin and First-Come First-Serve Protocols and Their Application to Multiprocessor Bus Arbitration;* Mary K. Vernon, Udi Manber; IEEE 1988, pp. 269-277.

*Primary Examiner*—Lawrence E. Anderson
*Assistant Examiner*—L. Donaghue
*Attorney, Agent, or Firm*—Roland I. Griffin; Alan H. Haggard

[57] ABSTRACT

A method for arbitrating access by a plurality of agents to a bus utilizes a priority access list. Each agent in the plurality of agents has a position on the priority access list. This position indicates the agent's relative priority level of access to the bus. When at least one agent from the plurality of agents requests access the bus, bus access is granted to the agent among the requesting agents which is highest on the priority access list. Once an agent from the plurality of agents has gained access to the bus, the agent which gained access to the bus is moved to the bottom of the priority access list.

16 Claims, 2 Drawing Sheets

DISTRIBUTED FAIR ARBITRATION SYSTEM USING SEPARATE GRANT AND REQUEST LINES FOR PROVIDING ACCESS TO DATA COMMUNICATION BUS

CROSS REFERENCE TO RELATED APPLICATION

This application is a continuation of application Ser. No. 07/436,144, filed Nov. 13, 1989, now abandoned.

BACKGROUND

The present invention concerns the use of a distributed priority list in order to implement a distributed fair arbitration scheme for providing agents with access to a data communication bus. An agent is a module on a bus which can master transactions.

When many agents simultaneously seek access to a bus, some type of arbitration scheme needs to be used to determine which agent may use the bus for its data transaction. In the prior art a number of schemes have been used. For example, in parallel contention schemes each agent is assigned an arbitration number which determines its access priority to the bus. In Round Robin Schemes there is a dynamic assignment of arbitration numbers and thus access priority to the bus is dynamic. In First-Come First-Served schemes there is an attempt to award an agent access to the bus in the order that the agents request access. In all these schemes there is an attempt to provide agents fair access to the bus with minimal overhead or implementation cost.

SUMMARY OF THE INVENTION

In accordance with the preferred embodiment of the present invention a method for arbitrating access by a plurality of agents to a bus is presented. A priority access list is maintained. Each agent in the plurality of agents has a position on the priority access list. This position indicates the agent's relative priority level of access to the bus. When more than one agent from the plurality of agents requests access to the bus, bus access is granted to the requesting agent which is higher on the priority access list than all other requesting agents. Once an agent from the plurality of agents has gained access to the bus, the agent which gained access to the bus is moved to the bottom of the priority access list.

In the preferred embodiment, the priority access list is distributed among the plurality of agents. Each agent includes a higher priority register. At initialization each agent is given an initial position on the priority access list. This is done by initializing each agent's higher priority register. Within each agent, the higher priority register is initialized. For example, a first higher priority register in a first agent is initialized. For every agent higher on the priority access list than the first agent a corresponding bit in the first higher priority register is set to logic 1. For every agent lower on the higher priority register than the first agent a corresponding bit in the first higher priority register is set to logic 0.

Once initialized, the order of agents on the priority access list is changed after an agent gains access to the bus. When an agent gains access to the bus, the agent is moved to the bottom of the priority access list. That is, the agent which gained access to the bus sets to logic 1 every bit in its higher priority register. Likewise, within every agent not gaining access to the bus, the bit within the higher priority register corresponding to the agent gaining access is set to logic 0.

The present invention is an improvement over the prior art in that it is an inexpensive and efficient implementation of a fair arbitration scheme. What is meant by a fair arbitration scheme is an arbitration scheme in which when more than one agent requests access to the bus, the requesting agent which least recently used the bus will be the agent that gains access to the bus.

DESCRIPTION OF THE PREFERRED EMBODIMENT

Figure 1:
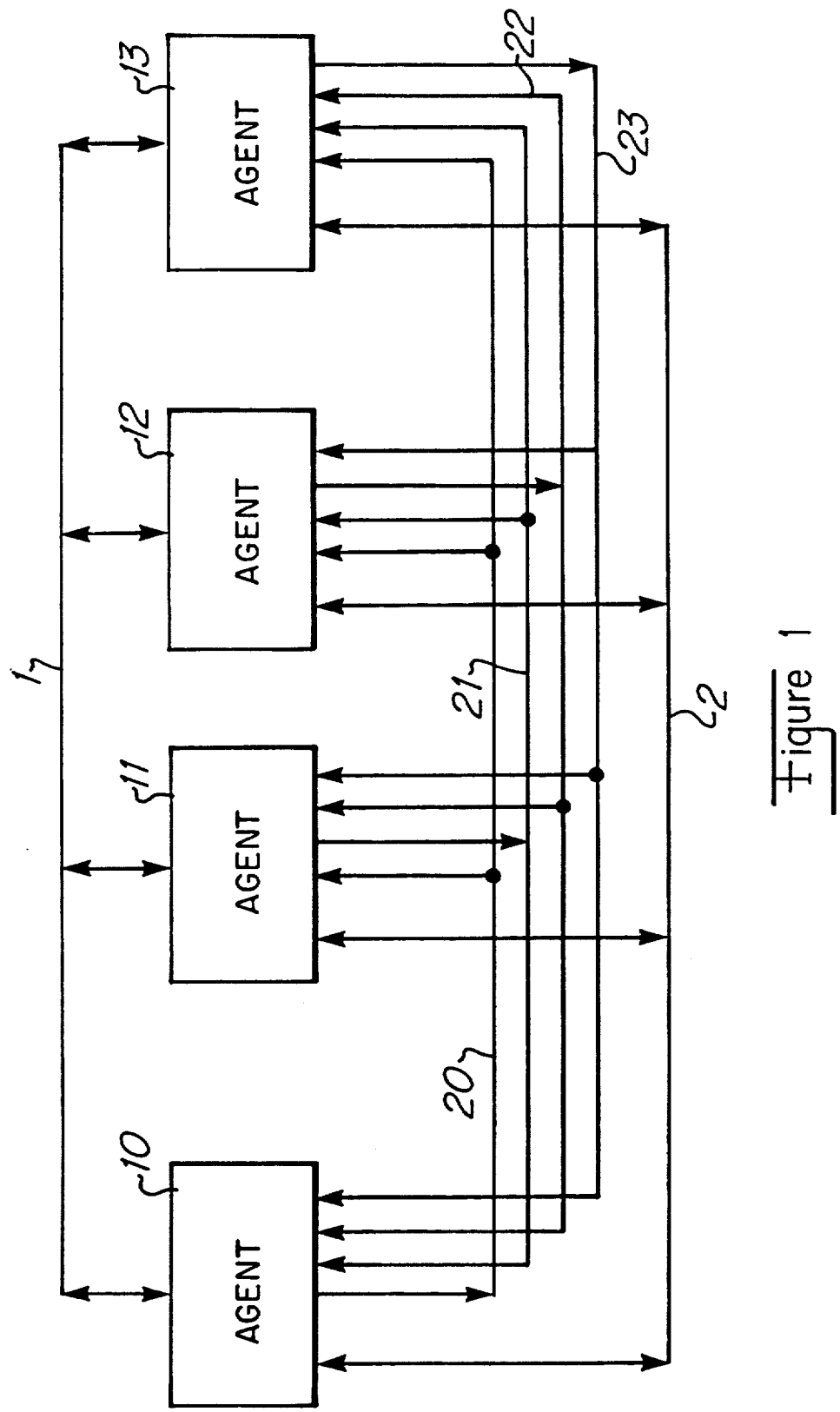
FIG. 1 shows agents connected to a bus in accordance with the preferred embodiment of the present invention.

In FIG. 1 an agent 10, an agent 11, an agent 12 and an agent 13 are shown connected to a bus 1. When any of agents 10, 11, 12 and 13 request access to bus 1 for a data transfer, an arbitration scheme is used to determine who can have control of bus 1. In the present distributed arbitration scheme, when agent 10 desires to access bus 1, agent 10 drives to logic 1 a line 20. When agent 11 desires to access bus 1, agent 11 drives to logic 1 a line 21. When agent 12 desires to access bus 1, agent 12 drives to logic 1 a line 22. When agent 13 desires to access bus 1, agent 13 drives to logic 1 a line 23.

When one of agents 10, 11, 12 and 13 is awarded access to bus 1, the agent receiving access identifies itself over lines 2. For example, if agent 10 gains access to bus 1, agent 10 will drive to logic 0 both of lines 2. If agent 11 gains access to bus 1, agent 11 will drive to logic 0 a first of lines 2 and drive a second of lines 2 to logic 1. If agent 12 gains access to bus 1, agent 12 will drive the first of lines to logic 1 and drive to logic 0 the second of lines 2. If agent 13 gains access to bus 1, agent 13 will drive both of lines 2 to logic 1.

Although in FIG. 1 lines 2, 20, 21, 22 and 23 are logically separate from bus 1 and are shown separate from bus 1; nevertheless, the lines of bus 1 may be time shared so that lines 2, 20, 21, 22 and 23 may be implemented by the same lines of bus 1 that transfer data.

In order to allow fair arbitration of bus access for each of agents 10, 11, 12 and 13, a distributed priority list is maintained by the agents. The distributed priority list is used to decide which agent may have access to bus 1. An agent at the top of the priority list has the highest priority to access bus 1. The agent next on the list has the next highest priority, and so on. The agent at the bottom of the priority list has the lowest priority.

When bus 1 is free, each of agents 10, 11, 12 and 13 which desires to access bus 1 will respectively drive one of lines 20, 21, 22, or 23 to logic 1, as described above. Of agents 10, 11, 12 and 13 which drive to logic 1 one of lines 20, 21, 22 or 23, the agent with the highest priority receives access to bus 1. The agent receiving access will identify itself on lines 2. The agent that received access to bus 1 gets moved to the bottom of the distributed priority list. This agent becomes the lowest priority agent for the next arbitration.

The information provided agents 10, 11, 12 and 13 over lines 2, 20, 21, 22 and 23 is enough to implement the distributed priority list access method. Each of agents 10, 11, 12 and 13 maintain a higher priority register. For each agent, its higher priority register contains one bit for every other agent. Thus a higher priority register for agent 10 will contain a bit for agent 11, a bit for agent 12 and a bit for agent 13. A higher priority register for agent 11 will contain a bit for agent 10, a bit for agent 12 and a bit for agent 13. A higher priority register for agent 12 will contain a bit for agent 10, a bit for agent 11 and a bit for agent 13. A higher priority register for agent 13 will contain a bit for agent 10, a bit for agent 11 and a bit for agent 12.

If a first of agents 10, 11, 12 and 13 has a lower priority than a second of agents 10, 11, 12 and 13, the bit within the higher priority register of the first of agents 10, 11, 12 and 13 which corresponds to the second of agents 10, 11, 12 and 13 will be set to logic 1. If the first of agents 10, 11, 12 and 13 has a higher priority than the second of agents 10, 11, 12 and 13, the bit within the higher priority register of the first of agents 10, 11, 12 and 13 which corresponds to the second of agents 10, 11, 12 and 13 will be set to logic 0.

For example, if agent 10 has the highest priority, all the bits in its higher priority register will be set to logic 0. If agent 11 has the second highest priority, the bit within its higher priority register which corresponds to agent 10 will be set to logic 1. All other bits within the higher priority register of agent 11 will be set to logic 0. If agent 12 has the third highest priority, the bits within its higher priority register which correspond to agent 10 and agent 11 will be set to logic 1. The bit within the higher priority register of agent 12 which corresponds to agent 13 will be set to logic 0. Agent 13 will then have the lowest priority and all the bits in the higher priority register of agent 13 will be set to logic 1.

An agent with a higher priority register which contains all logic 0s has the highest priority to access bus 1. An agent with a higher priority register which contains only one logic 1 has the second highest priority. An agent with a higher priority register which contains two logic 1s has the third highest priority. An agent with a higher priority register which contains all logic 1s has the lowest priority.

Table 1 below shows the contents of the higher priority registers for each of agents 10, 11, 12 and 13. In Table 1 and in the following tables, for the contents of each higher priority register, the leftmost bit represents the relative priority of agent 10, the second leftmost bit represents the relative priority of agent 11, the third leftmost bit represents the relative priority of agent 12 and the rightmost bit represents the relative priority of agent 13. An "X" refers to a register bit which has been deleted or is nullified.

TABLE 1

| Agent 10 | Agent 11 | Agent 12 | Agent 13 |
|---|---|---|---|
| X 0 0 0 | 1 X 0 0 | 1 1 X 0 | 1 1 1 X |

For example, at the first arbitration time agent 11 drives to logic 1 line 21 indicating agent 11 wants to access bus 1. Simultaneously, agent 13 drives to logic 1 line 23 indicating agent 13 also wants to access bus 1. Agent 10 and agent 12 do not want to access bus 1 at this time so lines 20 and lines 22 remain at logic 0. Each of agents 10, 11, 12 and 13 see values for lines 20, 21, 22 and 23 as shown in Table 2 below.

TABLE 2

| Line 20 | Line 21 | Line 22 | Line 23 |
|---|---|---|---|
| 0 | 1 | 0 | 1 |

Agent 13 will note that line 21 is driven to logic 1 indicating that agent 11 desires to access bus 1. Since the bit for agent 11 within the higher priority register of agent 13 is set to logic 1, agent 13 knows that it does not have high enough priority to access bus 1. Simultaneously agent 11, will note that line 23 is driven to logic 1 indicating that agent 13 desires to access bus 1. However, the bit for agent 13 within the higher priority register of agent 11 is set to logic 0, indicating that agent 11 has a higher priority than agent 13. Agent 11 thus realizes it has been granted access to bus 1. Agent 11 will then perform its desired bus transaction and will identify itself as the agent who accessed the bus by driving the logic value "01" on lines 2. Each of agents 10, 12 and 13 will then set to logic 0 the bit in their higher priority register for agent 11. Likewise, agent 11 will set to logic 1 the bits in its higher priority register. In this way agent 11 is moved to the bottom of the distributed priority list. Now, agent 10 will still have the highest priority, but agent 12 will have the second highest priority and agent 13 will have the third highest priority.

Table 3 below shows the contents of the higher priority registers for each of agents 10, 11, 12 and 13.

TABLE 3

| Agent 10 | Agent 11 | Agent 12 | Agent 13 |
|---|---|---|---|
| X 0 0 0 | 1 X 1 1 | 1 0 X 0 | 1 0 1 X |

Now, if agent 11 drives to logic 1 line 21 indicating agent 11 wants to access bus 1, and simultaneously, agent 13 drives to logic 1 line 23 indicating agent 13 also wants to access bus 1, a different result will occur. Suppose again agent 10 and agent 12 do not want to access bus 1, then lines 20 and lines 22 remain at logic 0. Each of agents 10, 11, 12 and 13 see values for lines 20, 21, 22 and 23 as shown in Table 4 below.

TABLE 4

| Line 20 | Line 21 | Line 22 | Line 23 |
|---|---|---|---|
| 0 | 1 | 0 | 1 |

Agent 11 will note that line 23 is driven to logic 1 indicating that agent 13 desires to access bus 1. Since the bit for agent 13 within the higher priority register of agent 11 is set to logic 1, agent 11 knows that it does not have high enough priority to access bus 1. Simultaneously agent 13, will note that line 21 is driven to logic 1 indicating that agent 11 desires to access bus 1. However, the bit for agent 11 within the higher priority register of agent 13 is set to logic 0, indicating that agent 13 has a higher priority than agent 11. Agent 13 thus realizes it has been granted access to bus 1. Agent 13 will then perform its desired bus transaction and will identify itself as the agent who accessed the bus by driving the logic value "11" on lines 2. Each of agents 10, 11 and 12 will then set to logic 0 the bit in their higher priority register for agent 13.

Likewise, agent 13 will set to logic 1 the bits in its higher priority register. In this way agent 13 is moved to the bottom of the distributed priority list. Now, agent 10 will still have the highest priority and agent 12 will have the second highest priority, but agent 11 will have the third highest priority.

Table 5 below shows the contents of the higher priority registers for each of agents 10, 11, 12 and 13.

TABLE 5

| Agent 10 | Agent 11 | Agent 12 | Agent 13 |
|---|---|---|---|
| X 0 0 0 | 1 X 1 0 | 1 0 X 0 | 1 1 1 X |

Now, for example, if agent 10 drives to logic 1 line 20 indicating agent 10 wants to access bus 1, and lines 21, 22, and 23 remain at logic 0 because agents 11, 12 and 13 do not want to access bus 1, then each of agents 10, 11, 12 and 13 see values for lines 20, 21, 22 and 23 as shown in Table 4 below.

TABLE 6

| Line 20 | Line 21 | Line 22 | Line 23 |
|---|---|---|---|
| 1 | 0 | 0 | 0 |

Agent 10 will note that none of lines 21, 22 and 23 are driven to logic 1. Therefore, agent 10 realizes it has been granted access to bus 1. Agent 10 will then perform its desired bus transaction and will identify itself as the agent who accessed the bus by driving the logic value "00" on lines 2. Each of agents 11, 12 and 13 will then set to logic 0 the bit in their higher priority register for agent 10.

Likewise, agent 10 will set to logic 1 the bits in its higher priority register. In this way agent 10 is moved to the bottom of the distributed priority list. Now, agent 12 will have the highest priority, agent 11 will have the second highest priority, and agent 13 will have the third highest priority.

Table 7 below shows the contents of the higher priority registers for each of agents 10, 11, 12 and 13.

TABLE 7

| Agent 10 | Agent 11 | Agent 12 | Agent 13 |
|---|---|---|---|
| X 1 1 1 | 0 X 1 0 | 0 0 X 0 | 0 1 1 X |

Now, for example, suppose agent 10 drives to logic 1 line 20 indicating agent 10 wants to access bus 1, agent 11 drives to logic 1 line 21 indicating agent 11 wants to access bus 1, and agent 13 drives to logic 1 line 23 indicating agent 13 wants to access bus 1. Line 22 remains at logic 0 indicating agent 12 does not want to access bus 1. Each of agents 10, 11, 12 and 13 sees values for lines 20, 21, 22 and 23 as shown in Table 8 below.

TABLE 8

| Line 20 | Line 21 | Line 22 | Line 23 |
|---|---|---|---|
| 1 | 1 | 0 | 1 |

Agent 10 will note that line 21 and line 23 are driven to logic 1 indicating that agent 11 and agent 13 desire to access bus 1. Since both the bits for agent 11 and agent 13 within the higher priority register of agent 10 are set to logic 1, agent 10 knows that it does not have high enough priority to access bus 1. Likewise, Agent 13 will note that line 20 and line 21 are driven to logic 1 indicating that agent 10 and agent 11 desire to access bus 1. Since the bit for agent 11 within the higher priority register of agent 13 is set to logic 1, agent 13 knows that it does not have high enough priority to access bus 1. Agent 11, will note that line 20 and line 23 are driven to logic 1 indicating that agent 10 and agent 13 desire to access bus 1. However, the bits for agent 10 and agent 13 within the higher priority register of agent 11 are set to logic 0, indicating that agent 11 has a higher priority than either agent 10 or agent 13. Agent 11 thus realizes it has been granted access to bus 1. Agent 11 will then perform its desired bus transaction and will identify itself as the agent who accessed the bus by driving the logic value "01" on lines 2. Each of agents 10, 12 and 13 will then set to logic 0 the bit in their higher priority register for agent 11. Likewise, agent 11 will set to logic 1 the bits in its higher priority register. In this way agent 11 is moved to the bottom of the distributed priority list. Now, agent 12 will still have the highest priority, but agent 13 will have the second highest priority and agent 10 will have the third highest priority.

Table 9 below shows the contents of the higher priority registers for each of agents 10, 11, 12 and 13.

TABLE 9

| Agent 10 | Agent 11 | Agent 12 | Agent 13 |
|---|---|---|---|
| X 0 1 1 | 1 X 1 1 | 0 0 X 0 | 0 0 1 X |

Figure 2:
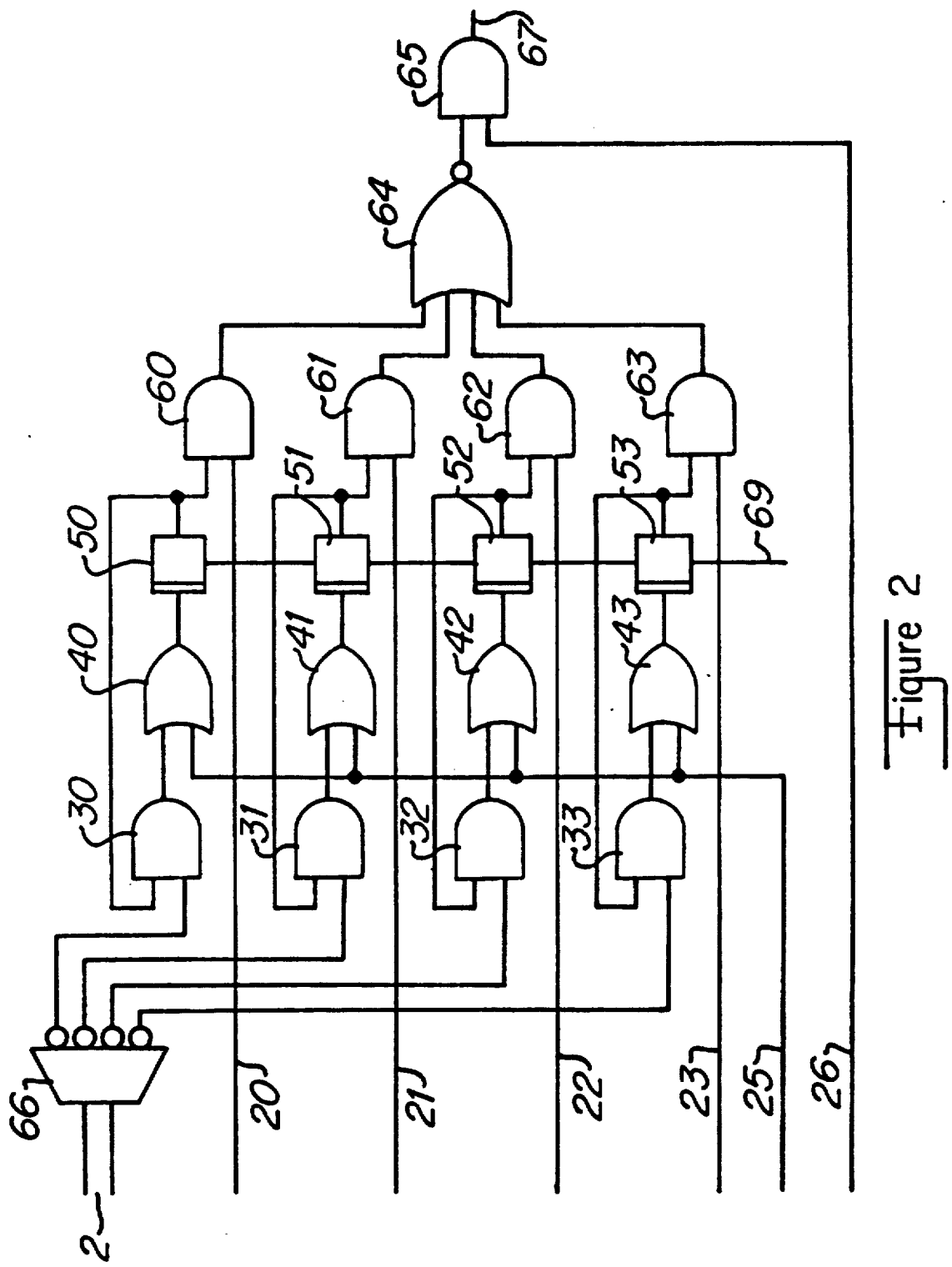
FIG. 2 shows hardware logic which implements a distributed fair arbitration scheme for a single agent in accordance with the preferred embodiment of the present invention.

FIG. 2 shows hardware logic which implements the distributed priority list for residing in each of agents 10, 11, 12 and 13. The hardware logic includes a bit register 50, a bit register 51, a bit register 52 and a bit register 53. Registers 50-53 are used as the higher priority register. Bit register 50 is the bit in the higher priority register for agent 10. Bit register 51 is the bit in the higher priority register for agent 11. Bit register 52 is the bit in the higher priority register for agent 12. Bit register 53 is the bit in the higher priority register for agent 13.

The hardware logic also includes a logical "AND" gate 30, a logical "AND" gate 31, a logical "AND" gate 32, a logical "AND" gate 33, a logical "AND" gate 60, a logical "AND" gate 61, a logical "AND" gate 62, a logical "AND" gate 63, a logical "AND" gate 65, a logical "OR" gate 40, a logical "OR" gate 41, a logical "OR" gate 42, a logical "OR" gate 43, a logical "NOR" gate 64 and a decoder 66 connected as shown.

The logic shown in FIG. 2 is generic for all the agents. However, when implemented in each agent the hardware logic shown in FIG. 2 includes redundant logic which must be eliminated or nullified. For example, for agent 10, logical "AND" gate 30, logical "OR" gate 40, bit register 50 and logical "AND" gate 60 should be either removed or nullified. When the logic is removed, logic "NOR" gate is reduced to three inputs. The logic may be nullified, for example, by replacing line 20 with a line connected to logic 0. Similarly, for agent 11, logical "AND" gate 31, logical "OR" gate 41, bit register 51 and logical "AND" gate 61 should be either removed or nullified. The logic may be nullified, for example, by replacing line 21 with a line connected to logic 0. For agent 12, logical "AND" gate 32, logical "OR" gate 42, bit register 52 and logical "AND" gate 62 should be either removed or nullified. The logic may be nullified, for example, by replacing line 22 with a line connected to logic 0. For agent 13, logical "AND" gate 33, logical "OR" gate 43, bit register 53 and logical "AND" gate 63 should be either removed or nullified. The logic may be nullified, for example, by replacing line 23 with a line connected to logic 0.

When an agent desires access to the bus it will drive to logic 1 its own line 26. If the result is that line 67 is driven to logic 1, this indicates to the agent that it has access to bus 1. Line 67 will be driven to logic 1 when none of the other agents with higher priority desire bus 1. If line 67 remains at logic 0, then the agent knows that it did not gain access to bus 1.

When the agent gains access to bus 1, a line 25 is driven to logic 1. This sets to logic 1 the bits in registers 50-53 for all the other agents. When another agent gains access to bus 1, the agent receiving access is identified by lines 2. Decoder 66 decodes lines 2 and causes to be driven to logic 0 the input of the register from registers 50-53 for the agent that gains access to bus 1. A clock input 69 clocks registers 50-53 setting registers 50-53 to the values at the input of each of the respective registers.

Once an agent receives all of the arbitration request signals from the other agents, it takes approximately two gate delays to determine if it won arbitration. This means an agent can determine whether or not it won arbitration in approximately one bus propagation time plus two gate delays.

While this description has presented an example of four agents accessing a bus, the distributed priority list arbitration method can be used to arbitrate any number N agents (numbered 0 through N-1). The cost to each agent of implementing the arbitration method is directly proportional to N.

The distributed priority list arbitration method guarantees that each agent will gain access to the bus within N-1 transaction times in the worst case of every agent continuously requesting access to the bus. The wait will be less than N-1 if the bus is not saturated, or if the agent has not requested the bus for some period of time. This is because if an agent does not request the bus for a long time, the agent rises to the top of the list as other agents gain access to the bus and are placed at the bottom of the list. When the agent finally requests the bus, it will have a very high priority, ensuring that it will quickly gain access to the bus.

All agents must be initialized to a consistent state before bus 1 is accessed. A simple initialization strategy is to initialize each higher priority register to a value based on the statically-assigned slot number of the agent on the bus. For example, the agent in the first slot would have the highest priority, the agent in the second slot would have the second highest priority, etc.

We claim:

1. A method in a computing system for arbitrating access to a bus by a plurality of agents, the method comprising the steps of:
   (a) maintaining a distributed priority access list in which each agent in the plurality of agents has a higher priority register which indicates the agent's relative priority level for obtaining access to the bus;
   (b) when more than one agent from the plurality of agents requests access to the bus, obtaining bus access by an agent from among the agents requesting access which is highest on the distributed priority access list, including the following substeps
      (b.1) signaling, by each agent requesting access to the bus, a request on a plurality of request lines, each of the plurality of request lines being coupled to each of the plurality of agents, and
      (b.2) signaling on grant lines, by the agent from among the agents requesting access which is highest on the distributed priority access list, the identity of the agent from among the agents requesting access which is highest on the distributed priority access list, each of the grant lines being coupled to each of the plurality of agents and being separate from the request lines; and,
   (c) once an agent from the plurality of agents has gained access to the bus, modifying each higher priority register to move the agent which gained access to the bottom of the distributed priority access list, wherein only the agent which gained access is moved lower on the distributed priority access list.

2. A method as in claim 1, wherein the bus includes the plurality of request lines.

3. A method as in claim 1 wherein in step (b.2) the signaling on the grant lines is accomplished by placing on the grant lines an encoded value which represents the identity of the agent from among the agents requesting access which is highest on the distributed priority access list.

4. A method in a computing system for arbitrating access to a bus by a plurality of agents, the method comprising the steps of:
   (a) maintaining a distributed priority access list in which each agent in the plurality of agents has a higher priority register which indicates the agent's relative priority level for obtaining access to the bus;
   (b) when more than one agent from the plurality of agents requests access to the bus, obtaining bus access by an agent from among the agents requesting access which is highest on the distributed priority access list, including the following substeps
      (b.1) signaling, by each agent requesting access to the bus, a request on a plurality of request lines, each of the plurality of request lines being coupled to each of the plurality of agents, and
      (b.2) signaling on grant lines, by the agent from among the agents requesting access which is highest on the distributed priority access list, the identity of the agent from among the agents requesting access which is highest on the distributed priority access list, each of the grant lines being coupled to each of the plurality of agents and being separate from the request lines; and,
   (c) once an agent from the plurality of agents has gained access to the bus, modifying each high priority register to move the agent which gained access to the bottom of the distributed priority access list wherein step (c) includes the substeps of:
      (c1) for the agent gaining access to the bus, setting to a first logic value all bits within the higher priority register of the agent gaining access to the bus; and,
      (c2) for agents in the plurality of agents not gaining access to the bus, setting to a second logic value a bit within the agent's higher priority register, the bit set to the second logic value corresponding to the agent which did gain access to the bus.

5. A method as in claim 4, wherein the bus includes the plurality of request lines.

6. A method as in claim 4 wherein in step (b.2) the signaling on the grant lines is accomplished by placing on the grant lines an encoded value which represents the identity of the agent from among the agents requesting access which is highest on the distributed priority access list.

7. A network system comprising:
   a bus;
   a plurality of agents, coupled to the bus;
   distributed list means, within each of the plurality of agents, for maintaining a distributed priority access list in which each agent in the plurality of agents has a position on the distributed priority access list which indicates each agent's relative priority level of access to the bus;

arbitration means, within each of the plurality of agents, for, upon at least one agent from the plurality of agents requesting access to the bus, granting bus access to an agent from among the at least one agent requesting access to the bus which is highest on the distributed priority access list, the arbitration means including a plurality of request lines, each of the plurality of request lines being coupled to each agent in the plurality of agents, each of the plurality of agents requesting access to the bus by placing a signal on a request line from the plurality of request lines, and grant lines, separate from the plurality of request lines and each of the grant lines being coupled to each agent of the plurality of agents, for signaling, a value by an agent on the grant lines identifying said agent as the agent which gains access to the bus; and, list maintenance means, within each of the plurality of agents and coupled to the distributed list means, for moving an agent to a bottom of the distributed priority access list once the agent has gained access to the bus, wherein the list maintenance means moves the agent lower on the distributed priority access list only when the agent gains access to the bus.

8. A network system as in claim 7, wherein the plurality of request lines are implemented by time sharing lines within the bus.

9. A network system as in claim 7 wherein the value on the grant lines is encoded.

10. A network system comprising:

a bus;

a plurality of agents, coupled to the bus;

distributed list means, within each of the plurality of agents, for maintaining a distributed priority access list in which each agent in the plurality of agents has a position on the distributed priority access list which indicates each agent's relative priority level of access to the bus, wherein the distributed list means includes within each agent from the plurality of agents:

a higher priority register, the higher priority register including a bit for every agent from the plurality of agents except for an agent containing the higher priority register, bits within the higher priority register being set to a first logic value for every agent from the plurality of agents which has a position higher on the distributed priority access list than the agent containing the higher priority register, and bits within the higher priority register being set to a second logic value for every agent from the plurality of agents which has a position lower on the distributed priority access list than the agent containing the higher priority register;

arbitration means, within each of the plurality of agents, for, upon at least one agent from the plurality of agents requesting access to the bus, granting bus access to an agent from among the at least one agent requesting access to the bus which is highest on the distributed priority access list, the arbitration means including a plurality of request lines, each of the plurality of request lines being coupled to each agent in the plurality of agents, each of the plurality of agents requesting access to the bus by placing a signal on a request line from the plurality of request lines, and grant lines, separate from the plurality of request lines and each of the grant lines being coupled to each agent of the plurality of agents, for signaling a value by an agent on the grant lines identifying said agent as the agent which gains access to the bus; and, list maintenance means, within each of the plurality of agents and coupled to the distributed list means, for moving an agent to a bottom of the distributed priority access list once the agent has gained access to the bus.

11. A network system as in claim 10 wherein the list maintenance means includes within each agent from the plurality of agents;

setting means, coupled to the higher priority register, for setting all bits to the first logic value within the higher priority register upon the agent containing the higher priority register gaining access to the bus; and, clearing means, coupled to the higher priority register, for setting to the second logic value a bit within the higher priority register for an agent which gains access to the bus when the agent which gains access to the bus is not the agent containing the higher priority register.

12. A network system as in claim 11 wherein the setting means includes within each agent from the plurality of agents, a register set line, the register set line logically coupled to all bits in the higher priority register, the register set line within a particular agent being driven to logic 1 when the particular agent gains access to the bus.

13. A network system as in claim 12 wherein the clearing means includes within each agent from the plurality of agents:

a plurality of logical "OR" gates, an output of each logical "OR" gate being coupled to a bit in the higher priority register and an input of each logical "OR" gate being coupled to the register set line;

a plurality of logical "AND" gates, an output of each logical "AND" gate being coupled to a logical "OR" gate from the plurality of logical "OR" gates, and a first input of each logical "AND" gate coupled to a bit in the higher priority register; and, decoding means, coupled to the grant lines, and coupled to a second input of each of the plurality of logical "AND" gates, for decoding the value on the grant lines and for driving on a second input of one of the plurality of logical "AND" gates a logic 0 for an agent which the value on the grant lines identifies as the agent which gains access to the bus.

14. A network system as in claim 10 wherein the arbitration means includes for each agent from the plurality of agents:

a plurality of access lines, coupled to the plurality of request lines, one access line in the plurality of access lines being driven to logic 1 when one agent in the plurality of agents desires to access the bus;

a plurality of "AND" gates, one "AND" gate for every agent in the plurality of agents, each "AND"

gate from the plurality of "AND" gates having an output, a first input and a second input, the first input being coupled to an access line, the output for a first "AND" gate in the plurality of "AND" gates for a first agent which contains the arbitration means being driven to logic 1 when the first agent has access to the bus, and the second input for every agent in the plurality of agents except the first agent being coupled to a bit within the higher priority register, a "NOR" gate, having an output and a plurality of inputs, the output of the "NOR" gate being coupled to a second input of the first "AND" gate, and each input being coupled to an output of an "AND" gate from the plurality of "AND" gates except the first "AND" gate.

15. A network system as in claim 10, wherein the plurality of request lines are implemented by time sharing lines within the bus.

16. A network system as in claim 10 wherein the value on the grant lines is encoded.

* * * * *